A. J. OTTO.
HIGH TEMPERATURE THERMOSTAT.
APPLICATION FILED FEB. 11, 1915.
1,337,367.
Patented Apr. 20, 1920.
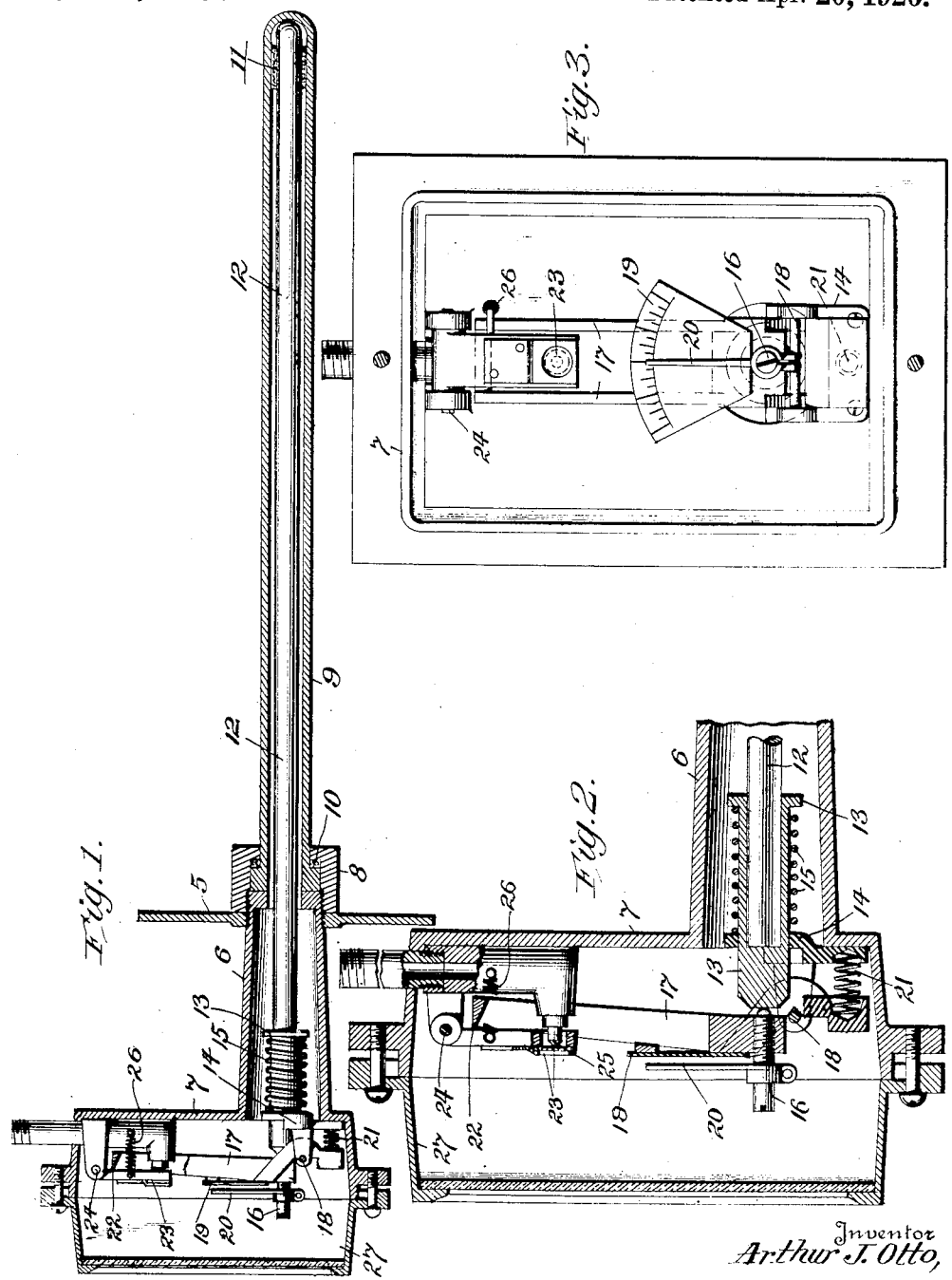
Inventor
Arthur J. Otto,
Witnesses
By Dodge & Sons.
Attorneys

UNITED STATES PATENT OFFICE.

ARTHUR J. OTTO, OF MILWAUKEE, WISCONSIN, ASSIGNOR TO JOHNSON SERVICE COMPANY, OF MILWAUKEE, WISCONSIN, A CORPORATION OF WISCONSIN.

HIGH-TEMPERATURE THERMOSTAT.

1,337,367.  Specification of Letters Patent.  Patented Apr. 20, 1920.

Application filed February 11, 1915. Serial No. 7,630.

*To all whom it may concern:*

Be it known that I, ARTHUR J. OTTO, a citizen of the United States, residing at Milwaukee, in the county of Milwaukee and State of Wisconsin, have invented certain new and useful Improvements in High-Temperature Thermostats, of which the following is a specification.

This invention relates to thermostatic couples and particularly to such a couple available for use at high temperatures to actuate thermostat mechanisms of known types.

The invention permits the automatic control of temperatures up to 1800 degrees Fahrenheit, (982° centigrade) and possibly higher, and the maintenance of such temperatures constant within a limit of 10 to 15 degrees Fahrenheit total variation.

Heretofore difficulty has been experienced in constructing devices for the automatic regulation of such high temperatures because of the lack of a thermostatic couple which is stable at such temperatures, and under the wide changes of temperature necessarily encountered at the beginning and end of periods of use.

The two elements of such a couple must have different coefficients of expansion; they must have high melting points; they must not be subject to oxidation even at high temperatures; they must not have any tendency to react chemically upon each other; they should be good conductors of heat; and they must not be adversely affected by relatively rapid and extreme changes of temperature.

I have discovered two substances possessing the above requirements in a pronounced degree. They are a fused aluminum oxid or artificial corundum commonly known commercially by the trade name "alundum", and fused silica.

The artificial corundum is made by known processes which involve the fusing of bauxite, or pure aluminum oxid in an electric furnace. The resulting product is a substantially pure fused aluminum oxid, the degree of purity depending on the raw material used. It is chemically quite inert, even at high temperatures and is a good conductor of heat. It melts at about 2050° centigrade and its coefficient of expansion is 0.0000071 per degree centigrade.

Pure fused silica ($SiO_2$) is chemically quite inert, even at high temperatures, and will withstand sudden and extreme variations in temperature. It melts at about 1750° centigrade and has a coefficient of expansion of 0.00000059 per degree centigrade. Absolute purity of the fused silica is not essential to its successful use in the present invention.

It will be noted that the coefficient of differential expansion of two similar rods of these materials is 0.00000651 per degree centigrade, which is amply sufficient for the intended purpose.

The preferred arrangement of these two substances to form a thermostatic couple comprises a rod of fused silica inclosed in a tube of alundum, the silica rod bearing against a closed end of the alundum tube and the two operating through their differential longitudinal expansion. Reasons for preferring this arrangement are the relatively high heat conductivity of the alundum, and the fact that it has much the higher coefficient of expansion; and hence should be directly subject to the variations of temperature to be controlled.

In order that the invention may be fully understood I shall now describe it as applied to a familiar type of pneumatic thermostat. Reference is made to the accompanying drawing, in which:—

Figure 1 is an axial section of the complete device;

Fig. 2 is a similar view on an enlarged scale showing the moving parts of the thermostat and their connection to the silica rod; and Fig. 3 is a front elevation of the device with the cover removed.

The device is carried on a wall plate 5 into which is screwed the tubular shank 6 of the casing 7. Clamped on the rear end of shank 6 by means of nut 8, and forming a continuation of the tubular shank 6 is the alundum tube 9, which is closed at the rear end as shown. Some refractory packing material is used at 10 to avoid possible injury to tube 9 by nut 8. Bearing against the closed end of tube 9 and centered by the ring 11 of asbestos or other refractory material is the fused silica rod 12. This rod extends forward through the shank 6 and bears in a thimble 13 which is supported and longitudinally guided in a guide plate 14. A spring 15 bearing against the thimble urges this rearwardly and holds the thimble 13, rod 12 and tube 9 in engagement with each other.

The head of thimble 13 bears against a thrust screw 16 in a lever 17 which is fulcrumed at 18. The lever 17 has a dial 19 and a hand 20 on screw 16 indicates the setting of this screw and consequently the adjustment of the thermostat. The lever 17 is urged by a spring 21 so as to press screw 16 against thimble 13.

The upper end of lever 17 carries a knife edge bearing 22 which bears against a pivoted valve plate 23 near its pivot 24. This valve coacts with a leak port 25 to close and open the same and is urged in a closing direction by a spring 26. The mechanism described forms a multiplying lever arrangement by which a slight fall in temperature will open leak port 25 and a slight rise will close it. The critical temperature at which such action occurs may be determined by adjusting screw 16. The leak port 25 may lead from a diaphragm motor chamber (not shown) to which air is supplied under pressure at a restricted rate as in the Johnson system of temperature regulation, or its opening and closing may exert a controlling action in other ways, known in the art. The cover 27 does not fit tightly on casing 7 but permits the escape of air vented from port 25.

In lieu of the mechanism shown, I may make use of other pneumatic devices, or electrical devices known in the art, and in fact my invention resides in the thermostatic couple and not in its application to any particular type of thermostat.

In the claims I have described the elements of the couple as "composed" of fused aluminum oxid and fused silica, but the use of this term does not imply absolute purity of these substances, for, as stated in the specification, this is not essential. The commercial products commonly contain impurities of a harmless nature, and are available for use in this device.

Having thus described my invention, what I claim is:—

1. A thermostatic couple comprising in combination two mechanically related elements, one of said elements being composed of alundum, and the other of fused silica.

2. A thermostatic couple comprising in combination two mechanically related elements, one of said elements being composed of fused aluminum oxid and the other of fused silica.

3. A thermostatic couple comprising in combination a rod element and an inclosing tube element arranged to operate by differential longitudinal expansion, one of said elements being composed of fused aluminum oxid and the other of fused silica.

4. A thermostatic couple comprising in combination a fused silica rod and a surrounding tube composed of fused aluminum oxid, said tube and rod being arranged to operate by differential longitudinal expansion.

5. A thermostatic couple comprising in combination a tube closed at one end and composed of fused aluminum oxid, and a fused silica rod mounted in said tube and bearing against the closed end thereof.

6. The combination of a movable member; a thermally responsive element composed of fused aluminum oxid; and a member composed of fused silica mechanically related to said responsive element and to said movable member for moving the latter by the movements of the former in response to temperature changes.

In testimony whereof I have signed my name to this specification in the presence of two subscribing witnesses.

ARTHUR J. OTTO.

Witnesses:
F. M. ZEALLEY,
CARL F. JOHNSON.